(12) United States Patent
Venugopal (10) Patent No.: US 12,437,399 B2
(45) Date of Patent: Oct. 7, 2025

(54) SYSTEM AND METHOD FOR LOCATION INSENSITIVE REPORTING OF FRACTIONAL FLOW RESERVE-COMPUTED TOMOGRAPHY FOR A GIVEN STENOSIS

(71) Applicant: GE Precision Healthcare LLC, Wauwatosa, WI (US)

(72) Inventor: Prem Venugopal, Clifton Park, NY (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 369 days.

(21) Appl. No.: 18/134,774

(22) Filed: Apr. 14, 2023

(65) Prior Publication Data

US 2024/0346644 A1    Oct. 17, 2024

(51) Int. Cl.
  *G06T 7/00*   (2017.01)
  *G06T 7/70*   (2017.01)
  *G16H 50/50*  (2018.01)

(52) U.S. Cl.
  CPC .............. *G06T 7/0012* (2013.01); *G06T 7/70* (2017.01); *G16H 50/50* (2018.01); *G06T 2207/10081* (2013.01); *G06T 2207/30104* (2013.01)

(58) Field of Classification Search
  CPC ......... A61B 6/032; A61B 6/466; A61B 6/504; A61B 6/507; G06T 2207/10081; G06T 2207/20084; G06T 2207/30104; G06T 7/0012; G06T 7/70; G16H 50/50
  See application file for complete search history.

(56) References Cited

U.S. PATENT DOCUMENTS 11,328,824 B2 * 5/2022 Fonte ................... A61B 5/0044
2021/0074435 A1   3/2021 Taylor et al.

OTHER PUBLICATIONS

U.S. Appl. No. 17/520,204, filed Nov. 5, 2021, Prem Venugopal.
U.S. Appl. No. 17/520,254, filed Nov. 5, 2021, Prem Venugopal.

* cited by examiner

*Primary Examiner* — Manuchehr Rahmjoo
(74) *Attorney, Agent, or Firm* — Fletcher Yoder, P.C.

(57) ABSTRACT

A method includes identifying stenosed region within vessel in vascular image data and generating a revascularized model of the vessel based on the vascular image data with a lumen boundary in the stenosed region adjusted to have a same cross-sectional area as healthy sections of the vessel. The method includes determining a first pressure distribution for the revascularized model at hyperemic flow, determining a second pressure distribution for the vessel in the vascular image data, and calculating a subtracted pressure distribution by subtracting the second pressure distribution from the first pressure distribution. The method includes determining an asymptotic value for the subtracted pressure distribution and calculating a value by subtracting the asymptotic value from a pressure value obtained from the second pressure distribution at a location at a beginning of the stenosed region. The method includes normalizing the value to obtain a location independent FFR value for the stenosed region.

20 Claims, 6 Drawing Sheets

SYSTEM AND METHOD FOR LOCATION INSENSITIVE REPORTING OF FRACTIONAL FLOW RESERVE-COMPUTED TOMOGRAPHY FOR A GIVEN STENOSIS

BACKGROUND

The subject matter disclosed herein relates to imaging systems and, more particularly, to a system and a method for location insensitive reporting of fractional flow reserve (FFR) computed tomography (CT) or FFR CT for a given stenosis.

Volumetric medical imaging technologies use a variety of techniques to gather three-dimensional information about the body. For example, a computed tomography (CT) imaging system measures the attenuation of X-ray beams passed through a patient from numerous angles. Based upon these measurements, a computer is able to reconstruct cross-sectional images of the portions of a patient's body responsible for the radiation attenuation. As will be appreciated by those skilled in the art, these images are based upon separate examination of a series of angularly-displaced measurements. It should be pointed out that a CT system produces data that represent the distribution of linear attenuation coefficients of the scanned object. The data are then reconstructed to produce an image that is typically displayed on a screen, and may be printed or reproduced on film.

For example, in the field of CT angiography (CTA), vasculature and other circulatory system structures may be imaged, typically by administration of a radio-opaque dye prior to imaging. Visualization of the CTA data typically is performed in a two-dimensional manner, i.e., slice-by-slice, or in a three-dimensional manner, i.e., volume visualization, which allows the data to be analyzed for vascular pathologies. For example, the data may be analyzed for aneurysms, vascular calcification, renal donor assessment, stent placement, vascular blockage, and vascular evaluation for sizing and/or runoff. Once a pathology is located, quantitative assessments of the pathology may be made of the on the original two-dimensional slices.

Atherosclerosis is a vascular disease in which cholesterol and other material accumulate along the inner lining of an artery forming atheromas or plaques. These plaque deposits, can over time, lead to a local narrowing of the blood vessel, often referred to as a stenosis. In the presence of a substantial stenosis, blood flow to the tissues downstream becomes severely restricted. Initially, severity of a stenosis was based purely on geometry, such as the percent reduction in lumen diameter. However, it was soon realized that anatomic significance of a stenosis did not always translate to functional significance. The concept of fractional flow reserve (FFR) was introduced to address this issue. It is defined as the ratio of pressure distal to the stenosis to the pressure proximal to it and measures the hemodynamic resistance of the stenosis relative to the resistance of the coronary microcirculation. Typically, FFR is measured at the time of invasive coronary angiography by inserting a tiny guide wire through a standard diagnostic catheter. A sensor at the tip of the wire measures pressure. Low values of FFR indicate a hemodynamically significant stenosis and clinical trials have demonstrated that intervention can be deferred when FFR is greater than 0.8.

Recently, model-based approaches for estimating FFR have been proposed. These approaches combine image data from computed tomography angiography (CTA) or invasive coronary angiography with computational fluid dynamics (CFD) modeling to estimate FFR. Unlike invasive FFR, where pressure measurements are recorded and reported at a single point distal to a lesion, FFR-CT provides estimates of pressure along the entire coronary tree. Unfortunately, there currently are no standards on where to report FFR-CT distal to a lesion. In addition, depending on the reporting location, the predicted FFR could be less than or greater than 0.8, adding uncertainty to the treatment decision. For example, a recent study found that approximately 44 percent of patients classified as FFR-CT positive (FFR-CT less than 0.8) based on the lowest FFR-CT value distal to an anatomical stenosis were reclassified as negative if the FFR-CT value located two centimeters distal to the stenosis was used.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a computer-implemented method for location insensitive reporting of a fraction flow reserve (FFR) value for a given stenosis is provided. The computer-implemented method includes obtaining, at a processor, vascular image data from a subject. The computer-implemented method also includes identifying, via the processor, a stenosed region within a vessel in the vascular image data. The computer-implemented method further includes generating, via the processor, a revascularized model of the vessel based on the vascular image data, wherein in the revascularized model a lumen boundary in the stenosed region is adjusted to have a same cross-sectional area as healthy sections of the vessel both proximal and distal to the stenosed region. The computer-implemented method even further includes determining, via the processor, a first pressure distribution for the revascularized model at hyperemic flow. The computer-implemented method still further includes determining, via the processor, a second pressure distribution for the vessel in the vascular image data. The computer-implemented method yet further includes calculating, via the processor, a subtracted pressure distribution by subtracting the second pressure distribution from the first pressure distribution. The computer-implemented method further includes determining, via the processor, an asymptotic value for the subtracted pressure distribution. The computer-implemented method even further includes calculating, via the processor, a value by subtracting the asymptotic value from a pressure value obtained from the second pressure distribution at a location at a beginning of the stenosed region in the vessel. The computer-implemented method yet further includes normalizing, via the processor, the value to obtain a location independent FFR value for the stenosed region.

In another embodiment, a system for location insensitive reporting of a fraction flow reserve (FFR) value for a given stenosis is provided. The system includes a memory encoding processor-executable routines. The system also includes a processor configured to access the memory and to execute the processor-executable routines, wherein the processor-executable routines, when executed by the processor, cause the processor to perform acts. The acts include obtaining vascular image data from a subject. The acts also include identifying a stenosed region within a vessel in the vascular image data. The acts further include generating a revascularized model of the vessel based on the vascular image data, wherein in the revascularized model a lumen boundary in the stenosed region is adjusted to have a same cross-sectional area as healthy sections of the vessel both proximal and distal to the stenosed region. The acts even further include determining a first pressure distribution for the revascularized model at hyperemic flow. The acts still further include determining a second pressure distribution for the vessel in the vascular image data. The acts yet further include calculating a subtracted pressure distribution by subtracting the second pressure distribution from the first pressure distribution. The acts further include determining an asymptotic value for the subtracted pressure distribution. The acts even further include calculating a value by subtracting the asymptotic value from a pressure value obtained from the second pressure distribution at a location at a beginning of the stenosed region in the vessel. The acts yet further include normalizing the value to obtain a location independent FFR value for the stenosed region.

In a further embodiment, a non-transitory computer-readable medium, the computer-readable medium including processor-executable code that when executed by a processor, causes the processor to perform acts. The acts include obtaining vascular image data from a subject. The acts also include identifying a stenosed region within a vessel in the vascular image data. The acts further include generating a revascularized model of the vessel based on the vascular image data, wherein in the revascularized model a lumen boundary in the stenosed region is adjusted to have a same cross-sectional area as healthy sections of the vessel both proximal and distal to the stenosed region. The acts even further include determining a first pressure distribution for the revascularized model at hyperemic flow. The acts still further include determining a second pressure distribution for the vessel in the vascular image data. The acts yet further include calculating a subtracted pressure distribution by subtracting the second pressure distribution from the first pressure distribution. The acts further include determining an asymptotic value for the subtracted pressure distribution. The acts even further include calculating a value by subtracting the asymptotic value from a pressure value obtained from the second pressure distribution at a location at a beginning of the stenosed region in the vessel. The acts yet further include normalizing the value to obtain a location independent FFR value for the stenosed region.

BRIEF DESCRIPTION OF THE DRAWINGS

These and other features, aspects, and advantages of the disclosed subject matter will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The end result of FFR-CT for a given stenosis is a predicted FFR value. However, this value is dependent on the location distal to the stenosis where the physician decides to report it. Depending on the reporting location, the predicted FFR could be less than or greater than 0.8, thus, adding uncertainty to the treatment decision.

The present disclosure provides embodiments for a system and a method for location insensitive reporting of an FFR value for a given stenosis. The system and the method may be utilized for one or more given stenoses in one or more different vessels or locations. In particular, the system and the method include obtaining vascular image data from a subject. The system and the method also include identifying a stenosed region (e.g., stenosis) within a vessel in the vascular image data (e.g., CTA image data obtained with a CT imaging system). In certain embodiments, during the identification of the stenosed region locations for a beginning and an end of the stenosed region may be determined.

The system and the method further include generating a revascularized model of the vessel based on the vascular image data, wherein in the revascularized model a lumen boundary in the stenosed region is adjusted to have a same cross-sectional area as healthy sections of the vessel both proximal and distal to the stenosed region. The system and the method even further include determining a first pressure distribution for the revascularized model at hyperemic flow. In certain embodiments, the hyperemic flow (i.e., maximal blood flow) may be estimated based on CTA scan data of a subject obtained under rest conditions. The system and the method still further include determining a second pressure distribution for the stenosed vessel in the vascular image data. Both the first and second pressure distributions may be determined utilizing computational fluid dynamics (CFD) calculations or modeling or through the use of deep learning algorithm trained to predict the pressure drop. The system and the method yet further include calculating a subtracted pressure distribution by subtracting the second pressure distribution from the first pressure distribution. The system and the method further include determining an asymptotic value for the subtracted pressure distribution. The system and the method even further include calculating a value by subtracting the asymptotic value from a pressure value obtained from the second pressure distribution at a location at a beginning of the stenosed region in the vessel. The system and the method yet further include normalizing the value to obtain a location independent FFR value for the stenosed region. For example, the value may be normalized by aortic pressure (e.g., mean aortic pressure) obtained from the subject. The system and the method may also include generating and displaying an FFR image, where the stenosed region in the vessel is identified and the location independent FFR value is displayed.

The disclosed system and method remove the sensitivity to the reporting location. The disclosed system and method also remove the uncertainty regarding a treatment decision (e.g., previously resulting from uncertainty in the FFR value). The disclosed system and method determine an appropriate FFR value for a given stenosis.

Although the following discusses the disclosed embodiments with regard to CT imaging systems, the techniques described herein may apply to other types of imaging systems. For example, the disclosed techniques may apply to an MRI system or a nuclear medicine imaging system such as a PET imaging system or a SPECT imaging system. The disclosed techniques may also apply to medical imaging systems having a combination of the above medical imaging modalities.

Figure 1:
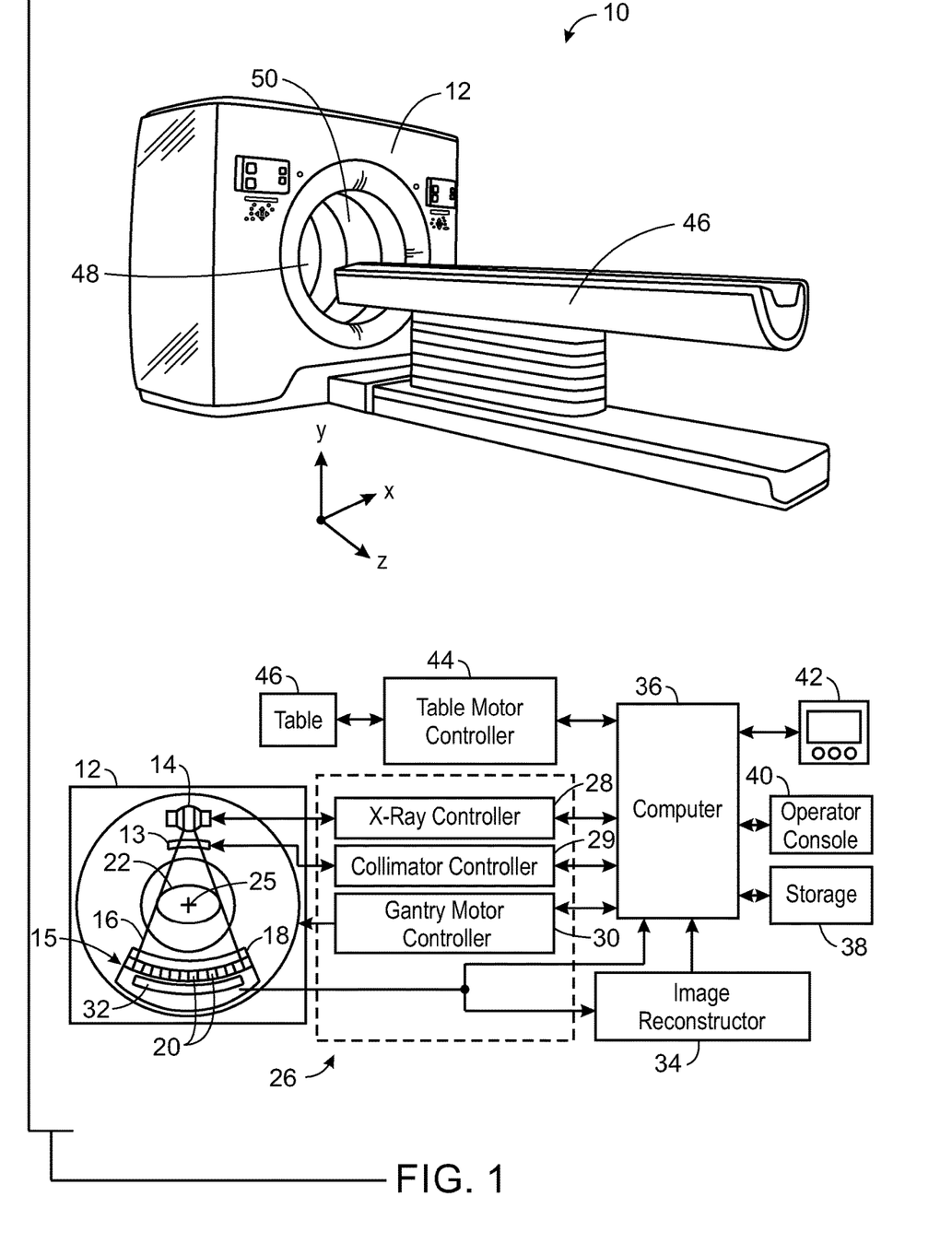
FIG. 1 is a combined pictorial view and block diagram of a computed tomography (CT) imaging system as discussed herein.

With the preceding in mind and referring to FIG. 1, a computed tomography (CT) imaging system 10 is shown, by way of example. The CT imaging system 10 includes a gantry 12. The gantry 12 has an X-ray source 14 that projects a beam of X-rays 16 toward a detector assembly 15 on the opposite side of the gantry 12. The X-ray source 14 projects the beam of X-rays 16 through a pre-patient collimator assembly 13 that determines the size and shape of the beam of X-rays 16. The detector assembly 15 includes a collimator assembly 18 (a post-patient collimator assembly), a plurality of detector modules 20 (e.g., detector elements or sensors), and data acquisition systems (DAS) 32. The plurality of detector modules 20 detect the projected X-rays that pass through a subject or object 22 being imaged, and DAS 32 converts the data into digital signals for subsequent processing. Each detector module 20 in a conventional system produces an analog electrical signal that represents the intensity of an incident X-ray beam and hence the attenuated beam as it passes through the subject or object 22. During a scan to acquire X-ray projection data, gantry 12 and the components mounted thereon rotate about a center of rotation 25 (e.g., isocenter) so as to collect attenuation data from a plurality of view angles relative to the imaged volume.

Rotation of gantry 12 and the operation of X-ray source 14 are governed by a control system 26 of CT imaging system 10. Control system 26 includes an X-ray controller 28 that provides power and timing signals to an X-ray source 14, a collimator controller 29 that controls a length and a width of an aperture of the pre-patient collimator 13 (and, thus, the size and shape of the beam of X-rays 16), and a gantry motor controller 30 that controls the rotational speed and position of gantry 12. An image reconstructor 34 receives sampled and digitized X-ray data from DAS 32 and performs high-speed image reconstruction. The reconstructed image is applied as an input to a computer 36, which stores the image in a storage device 38. Computer 36 also receives commands and scanning parameters from an operator via console 40. An associated display 42 allows the operator to observe the reconstructed image and other data from computer 36. The operator supplied commands and parameters are used by computer 36 to provide control signals and information to DAS 32, X-ray controller 28, collimator controller 29, and gantry motor controller 30. In addition, computer 36 operates a table motor controller 44, which controls a motorized table 46 to position subject 22 and gantry 12. Particularly, table 46 moves portions of subject 22 through a gantry opening or bore 48.

Figure 2:
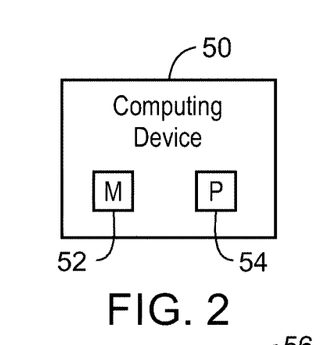
FIG. 2 is a schematic diagram of a computing device for performing the disclosed techniques, in accordance with aspects of the present disclosure.

FIG. 2 is a schematic diagram of a computing device 50 for performing the disclosed techniques herein. The computing device 50 may be computer 36 of the CT imaging system 10 in FIG. 1 or a remote computing device. In certain embodiments, the computing device 50 may be a remote cloud-based processing system.

The computing device 50 includes a memory 52 and a processor 54. In some embodiments, the processor 54 may include one or more general purpose processors, one or more application specific integrated circuits, one or more field programmable gate arrays, or the like. Additionally, the memory 52 may be any tangible, non-transitory, computer readable medium that is capable of storing instructions executable by the processor 54 and/or data that may be processed by the processor 54. In other words, the memory 52 may include volatile memory, such as random-access memory, or non-volatile memory, such as hard disk drives, read only memory, optical disks, flash memory, and the like. The memory 52 may store imaging data, patient-related data, models for CFD, and other data.

As described in greater detail below, the computing device 50 is configured to obtain (e.g., receive or access) vascular image data from a subject. The computing device 50 is also configured to identify a stenosed region (e.g., stenosis) within a vessel in the vascular image data (e.g., CTA image data obtained with a CT imaging system). In certain embodiments, during the identification of the stenosed region locations for a beginning and an end of the stenosed region may be determined. The computing device 50 is further configured to generate a revascularized model of the vessel based on the vascular image data, wherein in the revascularized model a lumen boundary in the stenosed region is adjusted to have a same cross-sectional area as healthy sections of the vessel both proximal and distal to the stenosed region. The computing device 50 is even further configured to determine a first pressure distribution for the revascularized model at hyperemic flow. In certain embodiments, the hyperemic flow may be estimated based on CTA scan data of a subject and one or more characteristics of the subject. The one or more characteristics may include age, weight, history of a previous myocardial infarction, diabetes, hypertension, or other characteristics. The computing device 50 is still further configured to determine a second pressure distribution for the vessel in the vascular image data. Both the first and second pressure distributions may be determined utilizing computational fluid dynamics (CFD) calculations or modeling or through the use of a deep learning algorithm trained to predict the pressure drop. The computing device 50 is yet further configured to calculate a subtracted pressure distribution by subtracting the second pressure distribution from the first pressure distribution. The computing device 50 is further configured to determine an asymptotic value for the subtracted pressure distribution. The computing device 50 is even further configured to calculate a value by subtracting the asymptotic value from a pressure value obtained from the second pressure distribution at a location at a beginning of the stenosed region in the vessel. The computing device 50 is yet further configured to normalize the value to obtain a location independent FFR value for the stenosed region. For example, the value may be normalized by aortic pressure (e.g., mean aortic pressure) obtained from the subject. The computing device 50 is may also be configured to generate and display an FFR image, where the stenosed region in the vessel is identified and the location independent FFR value is displayed. The location independent FFR value is displayed (e.g., reported) without a user having select an actual reporting location.

Figure 3:
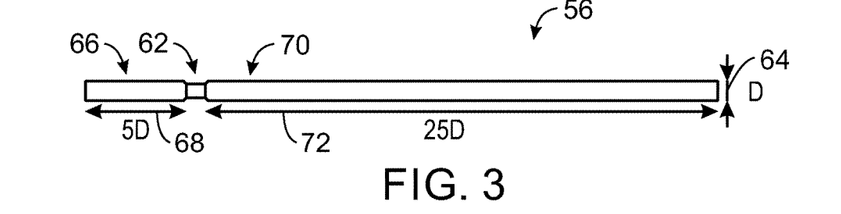
FIG. 3 is a schematic diagram of a geometric model of a vessel having a stenosed region or stenosis (e.g., with 40% stenosis), in accordance with aspects of the present disclosure.
Figure 4:
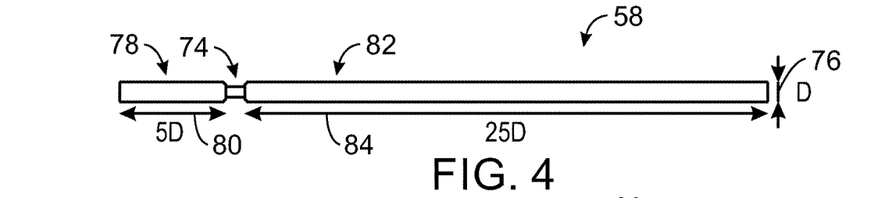
FIG. 4 is a schematic diagram of a geometric model of a vessel having a stenosed region or stenosis (e.g., with 60% stenosis), in accordance with aspects of the present disclosure.
Figure 5:
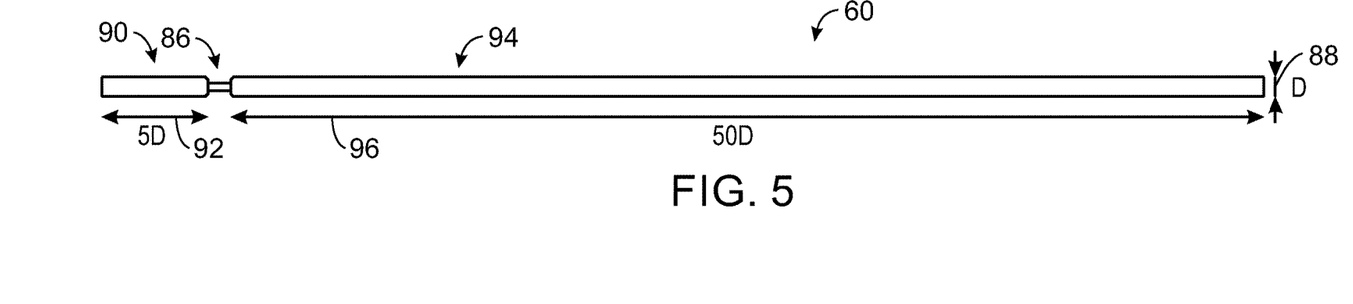
FIG. 5 is a schematic diagram of a geometric model of a vessel having a stenosed region or stenosis (e.g., with 80% stenosis), in accordance with aspects of the present disclosure.

FIGS. 3-5 are different geometric models 56, 58, 60 of vessels having a stenosed region or stenosis. The geometric models 56, 58, 60 were generated for the purpose of performing CFD calculations or modeling. FIG. 3 is the geometric model 56 of a vessel having a stenosed region or stenosis 62 having 40% stenosis. The geometric model 56 is non-dimensionalized using a diameter 64 (D) of an unobstructed section of the vessel. As depicted in FIG. 3, the geometric model 56 includes a region 66 having a length 68 five times the diameter 64 upstream of the stenosed region 62 and a region 70 having a length 72 twenty-five times the diameter 64 downstream of the stenosed region 62. FIG. 4 is the geometric model 58 of a vessel having a stenosed region or stenosis 74 having 60% stenosis. The geometric model 58 is non-dimensionalized using a diameter 76 (D) of an unobstructed section of the vessel. As depicted in FIG. 4, the geometric model 58 includes a region 78 having a length 80 five times the diameter 76 upstream of the stenosed region 74 and a region 82 having a length 84 twenty-five times the diameter 76 downstream of the stenosed region 74. FIG. 5 is the geometric model 60 of a vessel having a stenosed region or stenosis 86 having 80% stenosis. The geometric model 60 is non-dimensionalized using a diameter 88 (D) of an unobstructed section of the vessel. As depicted in FIG. 5, the geometric model 60 includes a region 90 having a length 92 five times the diameter 88 upstream of the stenosed region 86 and a region 94 having a length 96 fifty times the diameter 88 downstream of the stenosed region 86.

Figure 6:
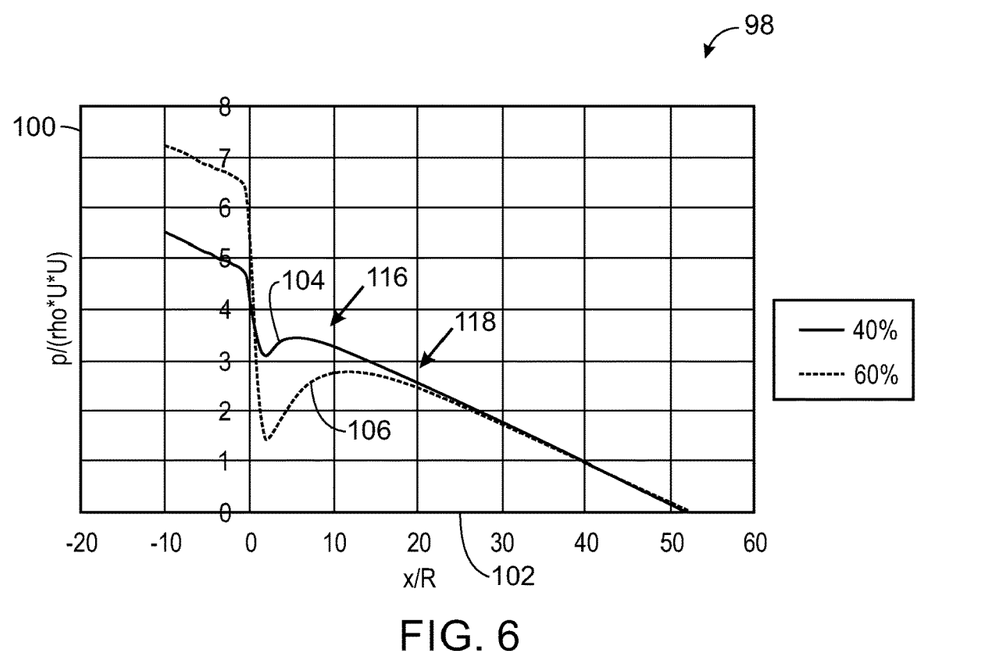
FIG. 6 is a graph of pressure distributions predicted for the geometric models in FIGS. 3 and 4, in accordance with aspects of the present disclosure.
Figure 7:
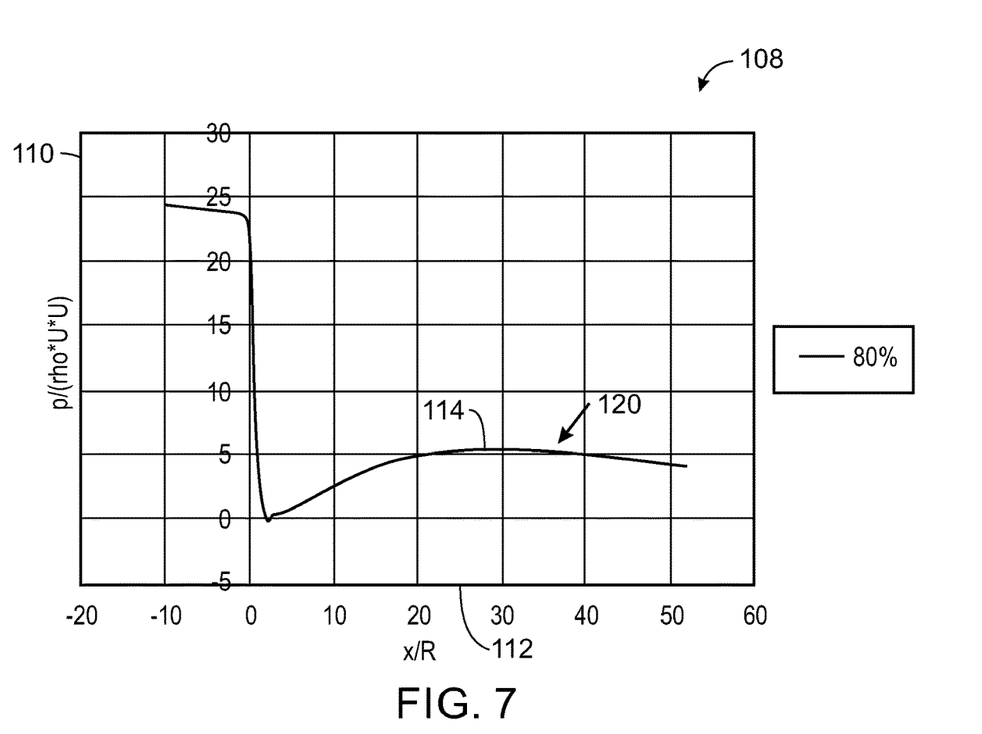
FIG. 7 is a graph of pressure distribution predicted for the geometric model in FIG. 5, in accordance with aspects of the present disclosure.

The different geometric models 56, 58, 60 in FIGS. 3-5 were utilized in performing steady state CFD calculations for a range of volume flow rates by imposing a fully developed velocity profile at the inlet. FIG. 6 is a graph 98 of pressure distributions (e.g., non-dimensionalized pressure distributions) predicted for the geometric models 56 and 58 in FIGS. 3 and 4 at one of these flow rates. The graph 98 includes a y-axis 100 representing non-dimensional pressure and an x-axis 102 representing a dimensionless axial distance along the vessel or model. Plot 104 represents the pressure distribution for the geometric model 56. Plot 106 represents the pressure distribution for the geometric model 58. FIG. 7 is a graph 108 of pressure distribution (e.g., non-dimensionalized pressure distribution) predicted for the geometric model 60 in FIG. 5 at the same flow rate utilized in FIG. 6 The graph 108 includes a y-axis 1110 representing non-dimensional pressure and an x-axis 112 representing a dimensionless axial distance along the vessel or model. Plot 114 represents the pressure distribution for the geometric model 60.

Since a fully developed velocity profile was imposed at the inlet, the pressure drop in the inlet section is linear (from x=−10 to x=0). This is followed by a sharp drop in pressure within the stenosis section due to the reduction in cross-sectional area as well as due to viscous losses. Downstream of the stenosis, the pressure tries to recover as the cross-sectional area increases. However, the pressure is not able to go back up to upstream levels due to losses generated by the stenosis. After the pressure recovery peak, pressure drop once again becomes linear once the velocity perturbations induced by the stenosis have died off.

Ideally, the reporting of the FFR value should occur just downstream of the pressure recovery peak (shown by arrows 116 and 118 (for plots 104 and 106, respectively) in FIG. 6 and arrow 120 for plot 114 in FIG. 7) so that all of the stenosis drop is included but nothing else. As depicted in FIGS. 6 and 7, this ideal location for reporting is dependent on the degree of the stenosis. In addition, the ideal location for reporting is dependent on the stenosis shape and flow rate. Therefore, a reporting location that works for all cases seems difficult to ascertain.

Figure 8:
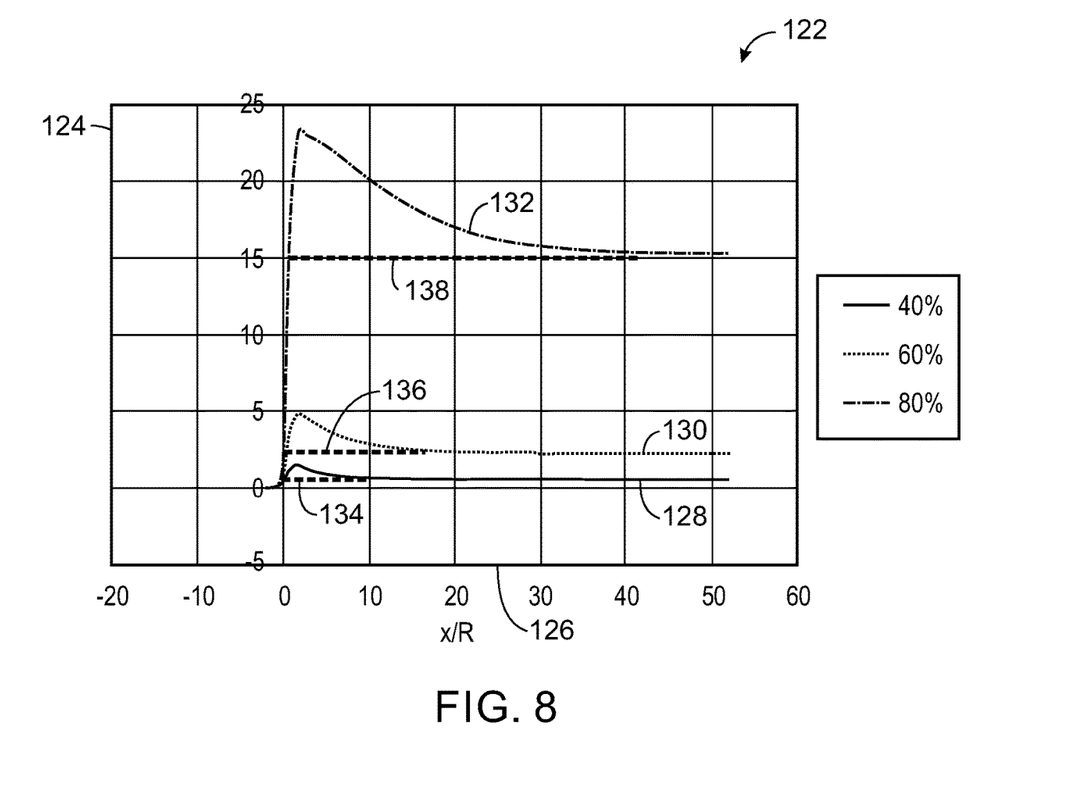
FIG. 8 is a graph of pressure distributions predicted for the geometric models in FIGS. 3-5 after subtracting the pressure distributions in FIGS. 6 and 7 from corresponding straight pipe distributions, in accordance with aspects of the present disclosure.

To determine the appropriate FFR value, the stenosed regions 62, 74, and 86 in the geometric models 56, 58, and 60, respectively, in FIGS. 3-5 need to be revascularized to have a straight pipe (i.e., consistent diameter) for determining a straight pipe pressure distribution for each revascularized geometric model 56, 58, and 60. In revascularization a lumen boundary in the stenosed region is adjusted to have approximately a same cross-sectional area as proximal and healthy section of the same vessel. FIG. 8 is a graph 122 of pressure distributions predicted for the geometric models 56, 58, and 60 in FIGS. 3-5 after subtracting the pressure distributions 104, 106, and 114 in FIGS. 6 and 7 from corresponding straight pipe distributions. In particular, revascularized geometric models 56, 58, and 60 were utilized in performing steady state CFD calculations utilizing the same conditions utilized (e.g., flow rate) for generating the pressure distributions in FIGS. 6 and 7. The steady state CFD calculations for the revascularized geometric models 56, 58, and 60 resulted in respective straight pipe pressure distributions for each of these. The respective straight pipe pressure distributions for the revascularized geometric models 56, 58, and 60 were subtracted from the corresponding pressure distributions 104, 106, and 114 for the geometric models 56, 58, and 60.

The graph 122 includes a y-axis 124 representing non-dimensional pressure and an x-axis 126 representing a dimensionless axial distance along the vessel or model. Plot 128 represents the pressure distribution resulting from the subtraction of the pressure distribution 104 from the revascularized straight pipe pressure distribution for the geometric model 56. Plot 130 represents the pressure distribution resulting from the subtraction of the pressure distribution 106 from the revascularized straight pipe pressure distribution for the geometric model 58. Plot 132 represents the pressure distribution resulting from the subtraction of the pressure distribution 114 from the revascularized straight pipe pressure distribution for the geometric model 60. The differences between pressure distributions 104, 106, and 114 and the corresponding straight pipe distributions reach a certain asymptotic value. Dashed horizontal line 134 represents the asymptote (e.g., horizontal asymptote) indicating the asymptotic value for plot 128 (e.g., greater than 0 but less than 1 as depicted in FIG. 8). Dashed horizontal line 136 represents the asymptote (e.g., horizontal asymptote) indicating the asymptotic value for plot 130 (e.g., approximately 2.5 as depicted in FIG. 8). Dashed horizontal line 138 represents the asymptote (e.g., horizontal asymptote) indicating the asymptotic value for plot 132 (e.g., approximately 15 as depicted in FIG. 8). The respective asymptotic values represent the respective stenosis pressure drop for the geometric models 56, 58, and 60. Subtracting the respective stenosis pressure drop from the pressure upstream of the respective stenosis for each of the geometric models 56, 58, and 60 provides the appropriate FFR model for the respective stenosis. This approach can be extended to realistic coronary stenosis as detailed in FIG. 9.

Figure 9:
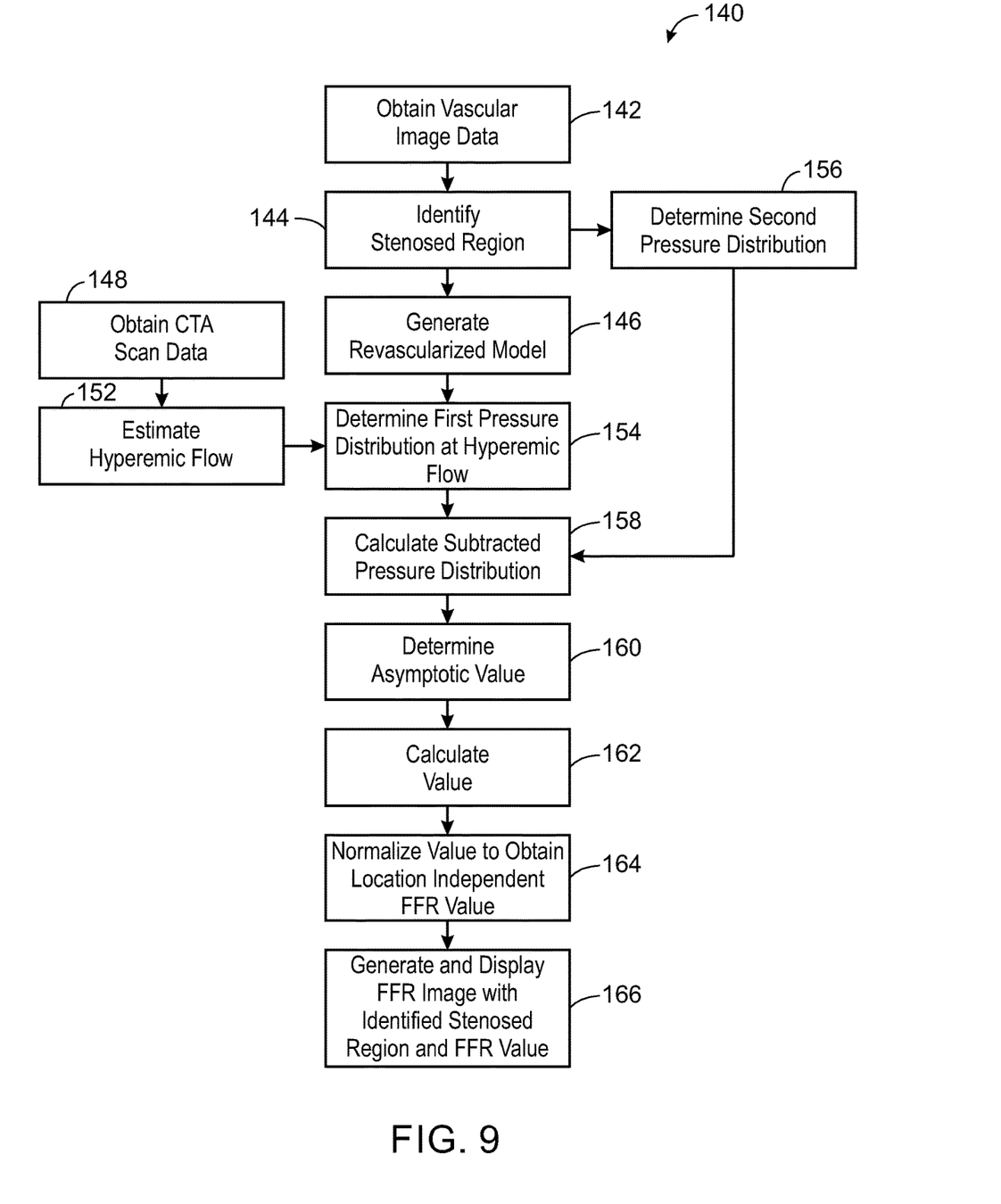
FIG. 9 is a flow chart of a method for location insensitive reporting of a fraction flow reserve (FFR) value for a given stenosis, in accordance with aspects of the present disclosure.

FIG. 9 is a flow chart of a method 140 for location insensitive reporting of a fraction flow reserve (FFR) value (e.g., FFR-CT value) for a given stenosis. Some or all of the steps of the method 140 may be performed by the computing device 50 in FIG. 2. One or more steps of the illustrated method 140 may performed in a different order from the order depicted in FIG. 9 and/or simultaneously. In certain embodiments, the method 140 may be utilized for multiple given locations in the same location (e.g., same vessel) or different locations (e.g., different vessels) of a subject.

The method 140 includes obtaining (e.g., receiving or accessing) vascular image data from a subject (block 142). In certain embodiments, the vascular image data is CTA image data obtained with a CT imaging system (e.g., CT imaging system 10 in FIG. 1). The method 140 also includes identifying a stenosed region (e.g., stenosis) within a vessel in the vascular image data (block 144). In certain embodiments, identifying the stenosed region also includes determining beginning and end locations of the stenosed region within the vessel. In certain embodiments, the stenosed region may be identified utilizing the techniques described in U.S. patent application Ser. No. 17/520,254, entitled "System and Method for Detecting Stenosis", filed on Nov. 5, 2021, which is herein incorporated for all purposes.

For example, a cross-sectional area distribution may be utilized for detecting a stenosis. This detection technique may include obtaining segmented image patches of a vessel along a coronary tree path. The detection technique also includes determining a cross-sectional area distribution along an axial length of the vessel from the segmented image patches. The detection technique further includes determining critical points in the cross-sectional area distribution. The detection technique even further includes detecting a presence of a stenosis based on the critical points in the cross-sectional area distribution.

Alternatively, pressure drop distribution may be utilized for detecting a stenosis. This detection technique may include obtaining segmented image patches of a vessel along a coronary tree path and associated coronary flow distribution for respective vessel segments in the segmented image patches. The detection technique also includes determining a pressure drop distribution along an axial length of the vessel from the segmented image patches and the associated coronary flow distribution. The detection technique further includes determining critical points in the pressure drop distribution. The detection technique even further includes detecting a presence of a stenosis based on the critical points in the pressure drop distribution. In certain embodiments, other techniques besides these may be utilized to identify/detect the stenosis.

The method 140 further includes generating (e.g., virtually) a revascularized model of the vessel based on or from the vascular image data (block 146). In the revascularized model a lumen boundary in the stenosed region is adjusted to have a same cross-sectional area as healthy sections of the vessel both proximal and distal to the stenosed region.

The method 140 even further includes obtaining CTA scan data of the subject during rest conditions for modeling hyperemic flow (i.e., maximal blood flow) (block 148). In certain embodiments, the CTA scan data may be acquired separately from the CTA scan data utilized for obtaining the vessel with the stenosed region and generating the revascularized model. In certain embodiments, the CTA scan data may be the same data utilized for obtaining the vessel with the stenosed region and generating the revascularized model. The method 140 yet further includes estimating hyperemic flow (i.e., maximal blood flow) based on the obtained CTA scan data of a subject (block 152).

The method 140 even further includes determining a first pressure distribution for the revascularized model at hyperemic flow (block 154). The method 140 still further includes determining a second pressure distribution for the stenosed vessel in the vascular image data (block 156). Both the first and second pressure distributions may be determined utilizing computational fluid dynamics (CFD) calculations or modeling or through the use of a deep-learning algorithm trained to predict the pressure drop. The method 140 yet further includes calculating a subtracted pressure distribution by subtracting the second pressure distribution from the first pressure distribution (block 158).

The method 140 further includes determining an asymptotic value for the subtracted pressure distribution (block 160). The method 140 even further includes calculating a value by subtracting the asymptotic value from a pressure value obtained from the second pressure distribution at a location at a beginning of the stenosed region in the vessel (block 162). The method 140 yet further includes normalizing the value to obtain a location independent FFR value for the stenosed region (block 164). For example, the value may be normalized by aortic pressure (e.g., mean aortic pressure) obtained from the subject. In certain embodiments, alternatively, the FFR value for the stenosed region may be determined by determining the location on the subtracted pressure distribution where the subtracted pressure distribution asymptotes out and then utilizing that location on the second pressure distribution to report the FFR-CT value.

Figure 10:
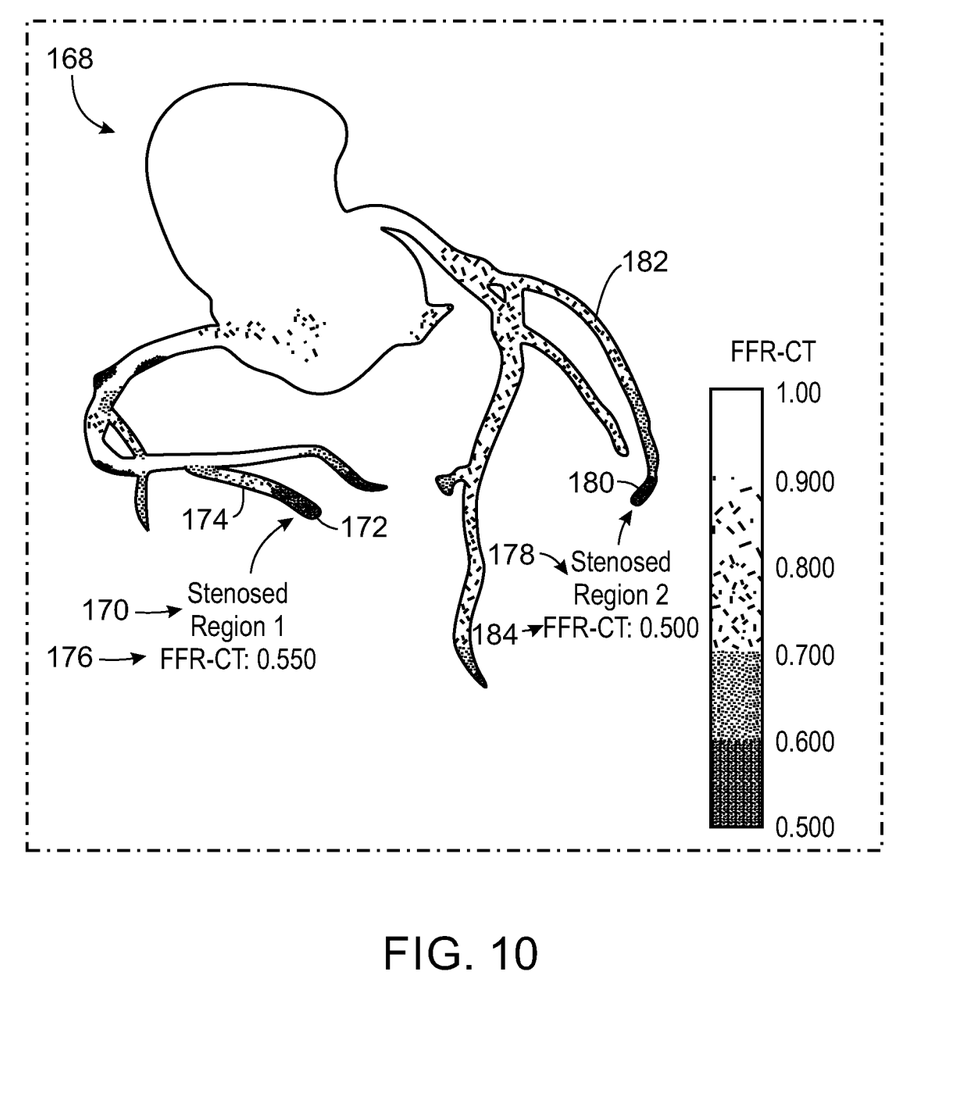
FIG. 10 depicts an FFR image, in accordance with aspects of the present disclosure.

In certain embodiments, the method 140 also includes generating and displaying an FFR image, where the stenosed region in the vessel is identified and the location independent FFR value is displayed (block 166). The location independent FFR value is displayed (e.g., reported) without a user having to select an actual reporting location. FIG. 10 depicts an example of an FFR image 168 derived from a CTA image data of a subject and CFD or deep-learning based calculations. The FFR image 168 includes an indication 170 of a first stenosed region 172 in a first vessel 174 and a location independent FFR value 176 (e.g., location independent FFR-CT value) displayed. The FFR image 168 also includes an indication 178 of a second stenosed region 180 in a second vessel 182 and a location independent FFR value 184 (e.g., location independent FFR-CT value) displayed. For simplicity, only two of the detected stenosed regions are identified in FIG. 10. The stenosed regions 172 and 180 were detected and the location independent FFR values 176 and 184 determined utilizing the techniques described above (e.g., the method 140 in FIG. 9). The location independent FFR values 176 and 184 are displayed (e.g., reported) without a user having to select an actual reporting location for the detected stenosed regions 172 and 180.

Technical effects of the disclosed embodiments include providing location insensitive reporting of an FFR value for a given stenosis. In particular, the disclosed embodiments remove the sensitivity to the reporting location. Also, the disclosed embodiments also remove the uncertainty regarding a treatment decision (e.g., previously resulting from uncertainty in the FFR value). Further, the disclosed embodiments determine an appropriate FFR value for a given stenosis The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for location insensitive reporting of a fraction flow reserve (FFR) value for a given stenosis, comprising:
   obtaining, at a processor, vascular image data from a subject;
   identifying, via the processor, a stenosed region within a vessel in the vascular image data;
   generating, via the processor, a revascularized model of the vessel based on the vascular image data, wherein in the revascularized model a lumen boundary in the stenosed region is adjusted to have a same cross-sectional area as healthy sections of the vessel both proximal and distal to the stenosed region;
   determining, via the processor, a first pressure distribution for the revascularized model at hyperemic flow;
   determining, via the processor, a second pressure distribution for the vessel in the vascular image data;
   calculating, via the processor, a subtracted pressure distribution by subtracting the second pressure distribution from the first pressure distribution;
   determining, via the processor, an asymptotic value for the subtracted pressure distribution;
   calculating, via the processor, a value by subtracting the asymptotic value from a pressure value obtained from the second pressure distribution at a location at a beginning of the stenosed region in the vessel; and
   normalizing, via the processor, the value to obtain a location independent FFR value for the stenosed region.

2. The computer-implemented method of claim 1, wherein the location independent FFR value is displayed without a user having to select an actual reporting location for the stenosed region.

3. The computer-implemented method of claim 1, wherein normalizing the value to obtain the location independent FFR value comprises normalizing the value by an aortic pressure obtained from the subject.

4. The computer-implemented method of claim 1, wherein the vascular image data is computed tomography angiography image data.

5. The computer-implemented method of claim 1, further comprising estimating, via the processor, the hyperemic flow based on computed tomography angiography scan data.

6. The computer-implemented method of claim 1, further comprising determining, via the processor, locations for the beginning and an end of the stenosed region during identification of the stenosed region.

7. The computer-implemented method of claim 1, wherein determining the first pressure distribution and the second pressure distribution comprises utilizing steady state computational fluid dynamics (CFD) calculations.

8. The computer-implemented method of claim 1, wherein determining the first pressure distribution and the second pressure distribution comprises using a deep-learning algorithm trained to predict a pressure drop.

9. The computer-implemented method of claim 1, further comprising generating and displaying, via the processor, an FFR image, wherein the stenosed region in the vessel is identified and the location independent FFR value is displayed.

10. A system for location insensitive reporting of a fraction flow reserve (FFR) value for a given stenosis, comprising:
    a memory encoding processor-executable routines; and
    a processor configured to access the memory and to execute the processor-executable routines, wherein the processor-executable routines, when executed by the processor, cause the processor to:
    obtaining vascular image data from a subject;
    identify a stenosed region within a vessel in the vascular image data;
    generate a revascularized model of the vessel based on the vascular image data, wherein in the revascularized model a lumen boundary in the stenosed region is adjusted to have a same cross-sectional area as healthy sections of the vessel both proximal and distal to the stenosed region;
    determine a first pressure distribution for the revascularized model at hyperemic flow;
    determine a second pressure distribution for the vessel in the vascular image data;
    calculate a subtracted pressure distribution by subtracting the second pressure distribution from the first pressure distribution;
    determine an asymptotic value for the subtracted pressure distribution;
    calculate a value by subtracting the asymptotic value from a pressure value obtained from the second pressure distribution at a location at a beginning of the stenosed region in the vessel; and
    normalize the value to obtain a location independent FFR value for the stenosed region.

11. The system of claim 10, wherein normalizing the value to obtain the location independent FFR value comprises normalizing the value by an aortic pressure obtained from the subject.

12. The system of claim 10, wherein the vascular image data is computed tomography angiography image data.

13. The system of claim 10, wherein the processor-executable routines, when executed by the processor, cause the processor to estimate the hyperemic flow based on computed tomography angiography scan data.

14. The system of claim 10, wherein the processor-executable routines, when executed by the processor, cause the processor to determine locations for the beginning and an end of the stenosed region during identification of the stenosed region.

15. The system of claim 10, wherein determining the first pressure distribution and the second pressure distribution comprises utilizing steady state computational fluid dynamics (CFD) calculations.

16. The system of claim 10, wherein determining the first pressure distribution and the second pressure distribution comprises using a deep-learning algorithm trained to predict a pressure drop.

17. The system of claim 10, wherein the processor-executable routines, when executed by the processor, cause the processor to generate and display an FFR image, wherein the stenosed region in the vessel is identified and the location independent FFR value is displayed.

18. The system of claim 10, wherein the location independent FFR value is displayed without a user having to select an actual reporting location for the stenosed region.

19. A non-transitory computer-readable medium, the computer-readable medium comprising processor-executable code that when executed by a processor, causes the processor to:

obtain vascular image data from a subject;

identify a stenosed region within a vessel in the vascular image data;

generate a revascularized model of the vessel based on the vascular image data, wherein in the revascularized model a lumen boundary in the stenosed region is adjusted to have a same cross-sectional area as healthy sections of the vessel both proximal and distal to the stenosed region;

determine a first pressure distribution for the revascularized model at hyperemic flow;

determine a second pressure distribution for the vessel in the vascular image data;

calculate a subtracted pressure distribution by subtracting the second pressure distribution from the first pressure distribution;

determine an asymptotic value for the subtracted pressure distribution;

calculate a value by subtracting the asymptotic value from a pressure value obtained from the second pressure distribution at a location at a beginning of the stenosed region in the vessel; and normalize the value to obtain a location independent FFR value for the stenosed region.

20. The non-transitory computer-readable medium of claim 19, wherein the processor-executable code, when executed by the processor, cause the processor to generate and display an FFR image, wherein the stenosed region in the vessel is identified and the location independent FFR value is displayed, and wherein the location independent FFR value is displayed without a user having select an actual reporting location for the stenosed region.

* * * * *